May 19, 1953  W. PATROSIO  2,639,199
ADJUSTABLE BEARING FOR SURVEYING INSTRUMENTS
Filed Dec. 1, 1948
Fig. II
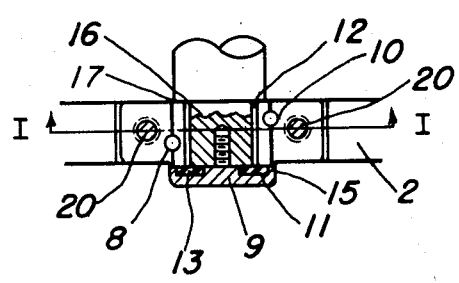
Fig. IV
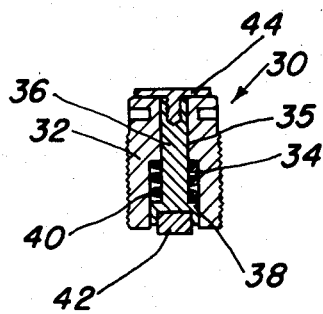
Fig. I
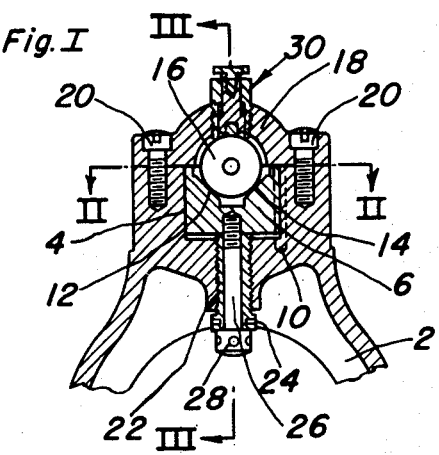
Fig. V
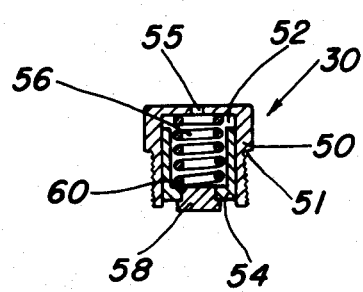
Fig. III
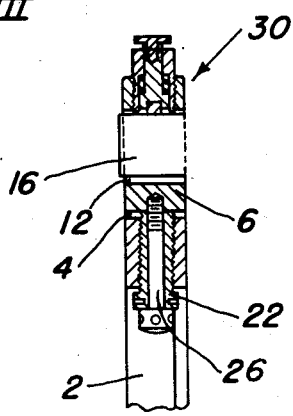
Fig. VI
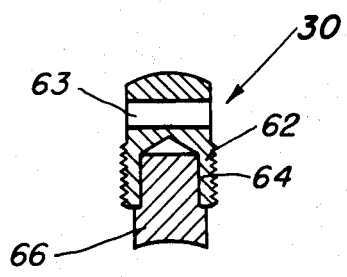
*INVENTOR.*
WILLIAM PATROSIO
BY J. Russell Juten
ATTORNEY Patented May 19, 1953

2,639,199

UNITED STATES PATENT OFFICE 2,639,199

ADJUSTABLE BEARING FOR SURVEYING INSTRUMENTS

William Patrosio, Jersey City, N. J., assignor to Keuffel & Esser Company, Hoboken, N. J., a corporation of New Jersey Application December 1, 1948, Serial No. 62,867

6 Claims. (Cl. 308—59)

This invention relates to surveying instruments in general and in particular to means for mounting the horizontal axle secured to the telescope on such instruments. It is important that the horizontal axle on such instruments be journaled "kinematically" in the standards, i. e. there should be no possibility of straining the axle and friction should be at a minimum but on the other hand it is not desirable to have excessive looseness between the axle and its bearing. It is also necessary to provide a vertical adjustment for the axle in at least one of the standards so that the axle may be aligned perpendicular to the vertical axis of the instrument.

It has been the practice to allow the telescope axle to rest on two plano surfaces inclined to each other in each standard under the action of gravity. These surfaces are preferably perpendicular to each other and at 45° to the vertical axis of the instrument. A substantial clearance is provided between the top surface of the telescope axle and a semi-cylindrical enclosing surface positioned over it. This design while kinematically correct permits substantial motion between the telescope axle and the semi-cylindrical enclosing surface if the transit is lifted by the telescope axle. This gives the impression of poor workmanship and is annoying when moving the instrument from place to place. Most surveying instruments are provided with a vernier positioned below the circle. Since motion of the type described will only tend to separate the circle and vernier no damage can be done. However, some instruments are also provided with stadia arcs. These may be described as special verniers which are held inside the circle at the ends of a horizontal diameter thereof. There is distinct danger of damage when the instrument is fitted with stadia arcs and the upward movement of the circle can bring it into contact with the stadia arcs.

Another related problem which arises in the manufacture of surveying instruments is the balancing of the telescope. This is complicated by the fact that the telescope is provided with an internal focusing slide the position of which will effect the balance of the telescope.

A third related problem is the wear of the horizontal axle and its bearing which may be accelerated if dirt is permitted to enter the bearing.

The principal object of this invention is to prevent any appreciable movement of the telescope axle in a surveying instrument with respect to its bearing.

Another object of the invention is to provide a self-contained assembly adjustably mounted in a surveying instrument standard which will not permit excessive movement between the telescope axle and standard and which will act as a brake on the telescope axle to keep the telescope in balance but which does not substantially effect the kinematic mounting of the axle in its V bearing.

A third object of the invention is to prevent the entrance of dirt to the horizontal axle bearings of a surveying instrument and thereby prevent excessive wear of the axle and the bearings.

These objects of the invention and the methods of their attainment will become more apparent from the following description taken in connection with the accompanying drawings in which:

Fig. I is a view in elevation showing the upper portion of a surveying instrument standard with a telescope axle journaled therein.

Fig. II is a view in section along the line II—II of Fig. I showing the telescope axle, its journal and a dust cap secured to the axle.

Fig. III is a view in section along the line III—III of Fig. I.

Fig. IV is a view in enlarged sectional elevation showing only the upper bearing block assembly taken along the line III—III of Fig. I.

Fig. V is a view in enlarged sectional elevation showing another embodiment of the upper bearing block assembly.

Fig. VI is a view in enlarged sectional elevation showing another embodiment of the upper bearing block assembly.

Fig. I shows one standard 2 of a surveying instrument. It is well known in the art that a surveying instrument has an alidade which is mounted for rotation about a vertical axis and which includes two standards supporting an axle which carries a telescope which is thereby mounted for rotation about a horizontal axis. These other parts of a conventional surveying instrument are not shown since they do not form part of this invention.

In Fig. I the standard 2 is provided with a rectangular recess 4. The adjustable lower bearing 6 fits in the recess 4 with a very close slide fit. The rods 8 and 10, see Fig. II, fit in holes drilled half in the adjustable lower bearing 6 and half in the standard 2. The rods 8 and 10 restrain any motion of the adjustable bearing 6 in any other than the direction parallel to the axle of the rods.

The adjustable lower bearing 6 is provided with two substantially flat surfaces 12 and 14 substantially perpendicular to each other and oppositely inclined at 45° to the vertical axis of the instrument and to the horizontal direction. The horizontal telescope axle 16 rests on the flat surfaces 12 and 14. The upper enclosing member 18 enclosing the axle 16 is secured to the standard 2 as by the screws 20.

The adjusting screw 22 engages threads in the standard 2 and its upper surface acts against the adjustable bearing 6, see Fig. III. The adjusting screw 22 is provided with a capstan head 24 so that it may be turned by means of a pin to raise or lower the adjustable bearing 6. The locking screw 26 passes through a coaxial hole in the adjusting screw 22 and is provided with threads which engage threads in the adjustable bearing 6. The locking screw 26 locks the adjustable bearing 6 in position against the upper surface of the adjusting screw 22. The locking screw 26 is also provided with a capstan head 28 which permits the screw 26 to be turned with a pin to lock or unlock the adjustable bearing 6.

In Fig. II the dust cap 9 which is in the form of a screw having a large flat head is provided with threads which engage threads provided in the horizontal axle 16. The head of the dust cap 9 is provided with an annular space 11 within an annular flange 15 for receiving a filler 13 in the form of a washer such as a felt washer, a resilient plastic composition, or the like. An annular flange 15 is provided at the rim of the cap 9. The annular flange 15 is spaced at a slight clearance from the lower bearing 6 and the upper bearing 18 so that it does not resist rotation of the horizontal axle. Any dirt which works its way past the annular flange 15 is prevented from passing to the bearing by the filter 13 so it does not get into the space between the horizontal axle 16 and the upper and lower bearings 6 and 18 where it would increase the wear of the bearing surfaces.

The horizontal axle 16 has an enlarged diameter on the inside of the standard 2 so that a step 17 is formed on the horizontal axle. The step 17 makes bearing contact with upper and lower bearings 6 and 18 so that dirt cannot enter the bearing from this side.

The bearing block assembly 30, various forms of which are shown in Figs. III, IV, V, and VI is mounted in the enclosing member 18. In the embodiment of the bearing block assembly shown in Figs. III and IV, the sleeve member 32 is externally threaded to fit a threaded hole in the enclosing member 18 and is provided with a capstan head to permit it to be turned for adjustment by means of an adjusting pin. The threads should fit rather tightly so that the adjustment may not be disturbed by accident or by turning by hand. The sleeve member 32 is provided with a concentric cylindrical hole 34 of large cross-section opening from the bottom. A cylindrical hole 35 of smaller cross-section extends from the hole 34 and opens at the top of the sleeve 32. The plunger member 36 is provided with an enlarged end section 38 slidably mounted in the concentric cylindrical hole 34 and which may extend below the sleeve 32. The plunger 36 also may extend through the hole 35 of smaller diameter in the upper end of the sleeve 32 through which it may slide. A spring or other compressible member 40 is provided in the cylindrical hole 34 and acts between the sleeve 32 and the enlarged end section 38 of the plunger 36 and tends to push the plunger 36 downwardly. The enlarged end section 38 of the plunger 36 is provided with a bearing block 42 such as a Babbitt block or block of other bearing material which makes contact with the upper surface of the horizontal axle 16 and which may be shaped to fit its cylindrical surface. The bearing block 42 may, for example, be pressed into a hole provided in the enlarged end of the plunger 38. The plunger 36 is free to turn in the sleeve 32 so that the bearing block 42 may always take the position in which it best fits the telescope axle 16. The screw or stop member 44 engages threads in the plunger 36 and its head engages the upper surface of the sleeve 32 when the bearing block 42 is withdrawn from contact with the telescope axle 16 thereby limiting the motion of the plunger 36 and holding together the assembly consisting of the sleeve 32, the plunger 38, and the spring 40.

The use of the embodiment of Fig. IV may be described as follows. After the position of the telescope axle has been adjusted with the adjusting screw 22 and locked with the locking screw 26 to make the telescope rotate about a horizontal axis the sleeve 32 is screwed down until its lower surface touches the telescope axle 16 compressing the spring 40. The sleeve 32 is then given a fractional turn in the opposite direction so that direct contact between the axle 16 and sleeve 32 is avoided. The Babbit block 42 is held in contact with the telescope axle 16 by spring 40 and continually exerts enough pressure on the axle 16 to brake its rotation under the action of small forces and in particular to hold it in any position in which the telescope might be placed regardless of the position of the internal focusing slide. This embodiment may be adjusted by the user of the instrument to take up any normal wear between the axle 16 and the lower bearing 6. However, the spring 40 does not exert enough pressure on the axle 16 to substantially effect the "kinematic" mounting. The telescope axle is restrained only by the flat surfaces 12 and 14 and the slight pressure exerted by the spring 40 on the bearing block 42. On the other hand there is only a very slight clearance between the sleeve 32 and the axle 16 and this can be adjusted as desired to prevent excessive movement between the axle and the lower bearing 6 which would give the impression of poor workmanship or even damage the circle and stadia arcs.

The screw 44 is not essential to the operation of the device as shown in Fig. IV and may be omitted if desired. It serves only to hold the assembly together as described so that one of its parts will not become lost, for ease of assembly, etc.

The embodiments shown in Fig. V and VI are also useful in some applications depending on the results sought. Referring first to Fig. V, the sleeve 50 is provided with a generally cylindrical concentric hole 52. A plunger 54 is slidably mounted in the hole 52. A compressible member or spring 56 acts between the sleeve 50 and the plunger 54. An air hole 55 is provided at the top of the sleeve 50 to permit air to pass in and out of the hole 52 to allow for movements of the piston 54. The piston 54 is fitted with a Babbitt plug bearing block 58 which may be shaped to fit the cylindrical surface of the telescope axle 16. The sleeve 50 is externally threaded at 60 for the purpose of securing it to the upper bearing 18. It has an enlarged cylindrical upper end so that a shoulder 51 is formed. The sleeve 50 is made oversize in length and a cut is taken off the bottom during final assembly of the instrument so that just a slight clearance remains between the end of the sleeve 50 and the telescope axle when the shoulder 51 is brought in contact with the upper surface of the enclosing member 18. The clearance is factory adjusted in this manner to about .005 of an inch or less so that very little motion is possible between the horizontal axle and its bearing so that there is no danger of damage to stadia arcs, etc. Readjustment of the assembly is possible by filing the shoulder 51 to bring the lower surface of the sleeve 50 closer to the axle or by filing the lower surface of the sleeve 50 to increase the clearance with respect to the axle.

In the embodiment of Fig. VI a sleeve member 62 is provided which is externally threaded to engage a threaded hole in the upper bearing 18 and is provided with a hole 63 for an adjusting pin so that the sleeve may be adjusted by turning. The sleeve 62 is provided with a concentric hole 64 for receiving the bearing block or Babbitt plug 66 which may be provided with a lower surface to match the surface of the axle. The Babbitt plug 66 is free to turn in the cylindrical hole 64 and take a position so that its lower surface will match the surface of the horizontal axle.

In using the embodiment of Fig. VI, the sleeve 62 is turned to press the Babbitt block 66 against the horizontal axle. This pressure is then relieved by turning in the opposite direction until the required braking effect is obtained. This embodiment eliminates play almost completely and is preferably made so that it may be readjusted by the user of the instrument.

Although the invention has been illustrated in conjunction with an adjustable lower bearing in Figs. I, II and III it need not necessarily be so used. As already described in a surveying instrument the telescope axle lower bearing is normally adjustable in one standard and fixed in the other. In the standard which does not have an adjustable bearing, the lower bearing may be an integral part of the standard. In either case, however, an upper bearing such as 18 in Fig. I is normally used and any of the bearing block assemblies of Figs. IV, V and VI may be used therewith. Minor modifications may be made without departing from the spirit and scope of the invention.

Having thus described the invention what is claimed is:

1. In an instrument having a horizontal axle resting on a lower bearing, an enclosing member mounted over the axle, a sleeve member having a concentric hole mounted in said enclosing member and a bearing block slidably supported in said concentric hole and making contact with the axle to brake its rotation under the action of small forces, said combination of said sleeve and said bearing block preventing excessive movement between the axle and the lower bearing.

2. In an instrument having a horizontal axle resting on a lower bearing, an enclosing member mounted over the axle, a sleeve member having a concentric hole mounted in said enclosing member the lower surface of which makes only a slight clearance with the upper surface of the horizontal axle to prevent excessive movement between the axle and the lower bearing, a plunger member slidably mounted in said concentric hole, a bearing block at the lower end of said plunger member, and a compressible member acting between said sleeve member and said plunger member to cause said bearing block to make contact with the axle to brake its rotation under the action of small forces.

3. In an instrument having a horizontal axle resting on a lower bearing, an enclosing member mounted over the axle, a sleeve member having a concentric hole which opens in a large cross-section at its lower end and a small cross-section at its upper end, said sleeve member being mounted in said enclosing member so that its lower surface is at only a slight clearance from the upper surface of the horizontal axle, a plunger member slidably mounted in said concentric hole so that it may extend through the upper end of the hole of small cross-section and also through the lower end of the hole of large cross-section, a stop member attached to the upper end of said plunger member which makes contact with the upper surface of said sleeve member to limit the motion of said plunger member, a bearing block at the lower end of said plunger member, a compressible member acting between said sleeve member and said plunger member to cause said bearing block to make contact with the axle to brake its rotation under the action of small forces.

4. In an instrument having a horizontal axle resting on a lower bearing, an enclosing member mounted over the axle, an externally threaded sleeve member having a concentric hole mounted in a threaded hole of said enclosing member so that it may be adjusted to bring its lower surface to within a slight clearance from the upper surface of the horizontal axle to prevent excessive movement between the horizontal axle and the lower bearing, a plunger member slidably mounted in said concentric hole, a bearing block at the lower end of said plunger member, a compressible member acting between said sleeve member and said plunger member to cause said bearing block to make contact with the axle to brake its rotation under the action of small forces.

5. In an instrument having a horizontal axle resting on a lower bearing, an enclosing member mounted over the axle, an externally threaded sleeve member having a concentric hole and an enlarged upper end forming a shoulder mounted on said enclosing member with said shoulder in contact with the upper surface thereof, said sleeve member being formed so that its lower surface is at only a slight clearance from the upper surface of the horizontal axle so that it will prevent excessive movement between the horizontal axle and the lower bearing, a plunger member slidably mounted in said concentric hole, a bearing block at the lower end of said plunger member, a compressible member acting between said sleeve member and said plunger member to cause said bearing block to make contact with the axle to brake its rotation under the action of small forces.

6. In an instrument having a horizontal axle resting on a lower bearing, an enclosing member mounted over the axle, a sleeve member having a concentric hole mounted in said enclosing member, a bearing block slidably mounted in the concentric hole of said sleeve member and making contact with the axle to brake its rotation under the action of small forces, a surface on said sleeve member limiting the upward movement of said bearing block and thereby holding it close to the axle to prevent excessive movement between the axle and the lower bearing.

WILLIAM PATROSIO.

(References on following page)

References Cited in the file of this patent

UNITED STATES PATENTS

| Number | Name | Date |
|---|---|---|
| Re. 17,265 | McKone | Apr. 9, 1929 |
| 600,938 | Vebelacker | Mar. 22, 1898 |
| 915,552 | Church | Mar. 16, 1909 |
| 1,057,648 | Lindhard | Apr. 1, 1913 |
| 1,067,382 | Solem | July 15, 1913 |
| 1,323,605 | Wheller | Dec. 2, 1919 |
| 1,716,062 | Johnson | June 4, 1929 |
| 2,224,652 | Kingsbury | Dec. 10, 1940 |
| 2,272,029 | Benson | Feb. 3, 1942 |
| 2,448,341 | Yeomans | Aug. 31, 1948 |

FOREIGN PATENTS

| Number | Country | Date |
|---|---|---|
| 426,022 | Great Britain | Mar. 26, 1925 |
| 493,560 | Great Britain | Oct. 11, 1938 |